A. T. KELLER.
VALVE GEAR FOR ENGINES.
APPLICATION FILED AUG. 27, 1906.

917,452.

Patented Apr. 6, 1909.
4 SHEETS—SHEET 1.

WITNESSES
INVENTOR
A. T. Keller,
by Bakewell & Byrnes,
his Attys.

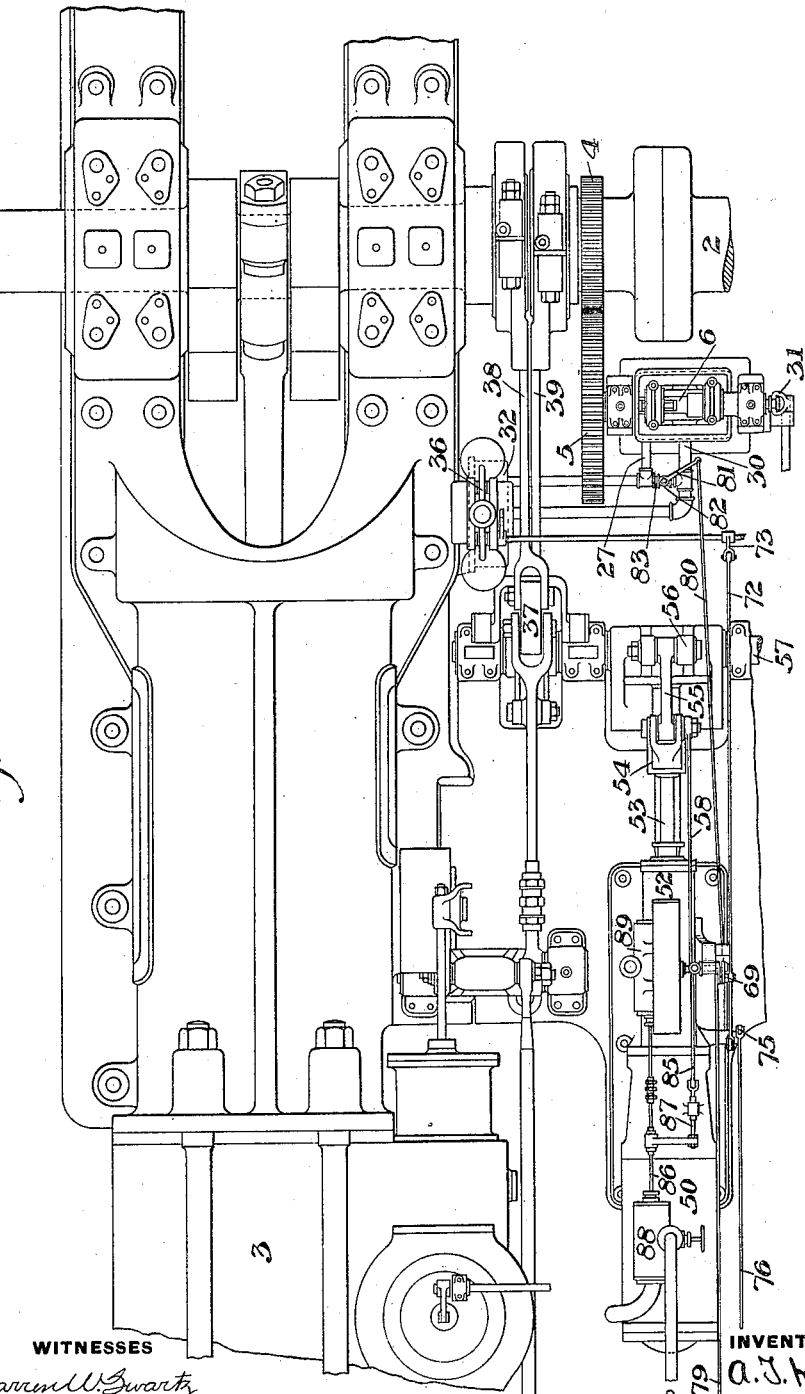

A. T. KELLER.
VALVE GEAR FOR ENGINES.
APPLICATION FILED AUG. 27, 1906.

917,452.

Patented Apr. 6, 1909.
4 SHEETS—SHEET 3.

WITNESSES
Warren W. Swartz
J. B. Bleming

INVENTOR
A. T. Keller,
by Bakewell & Byrnes,
his attys.

A. T. KELLER.
VALVE GEAR FOR ENGINES.
APPLICATION FILED AUG. 27, 1906.
917,452.
Patented Apr. 6, 1909.
4 SHEETS—SHEET 4.
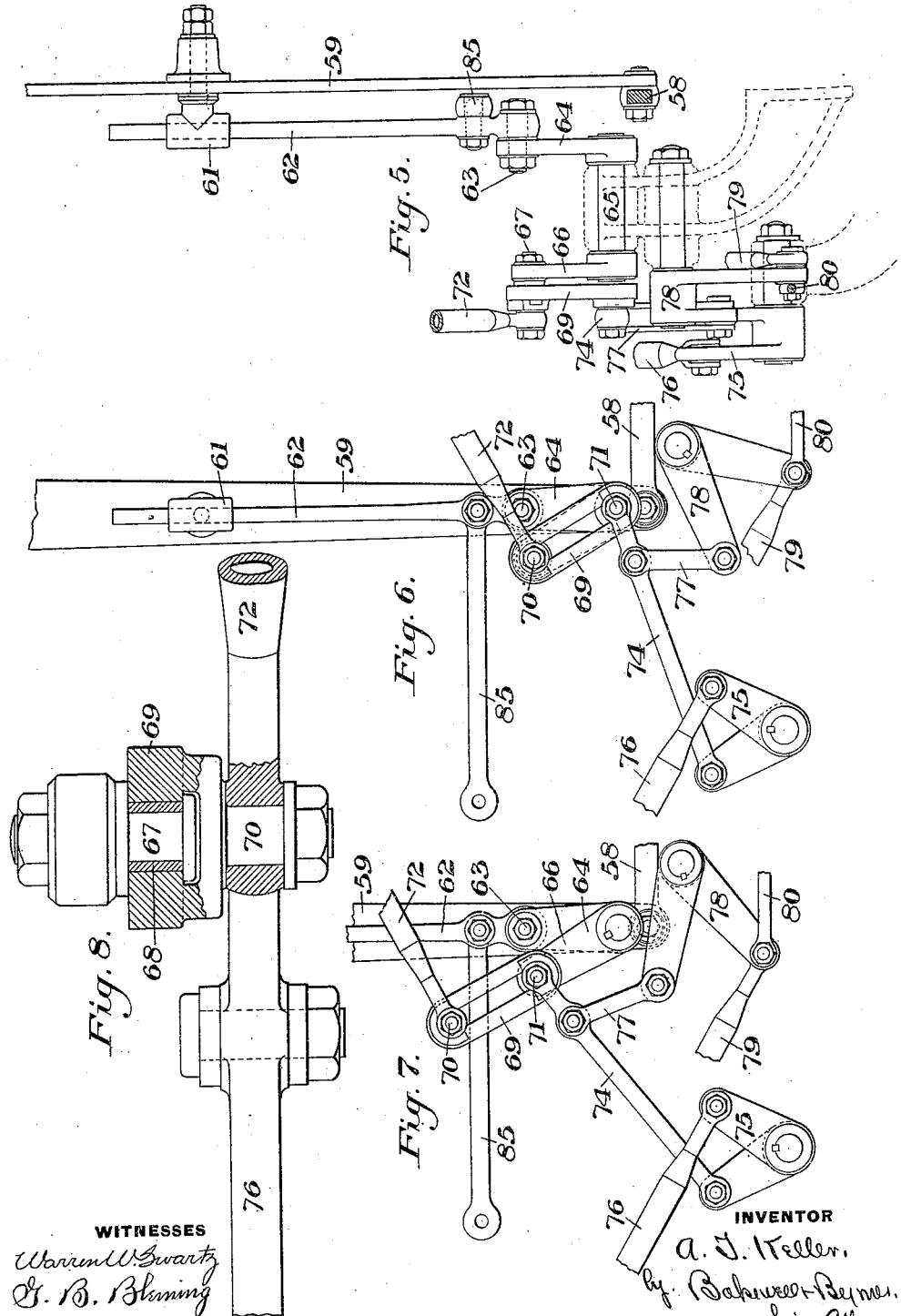
WITNESSES
INVENTOR

UNITED STATES PATENT OFFICE.

ALBERT T. KELLER, OF PITTSBURG, PENNSYLVANIA, ASSIGNOR OF ONE-HALF TO MESTA MACHINE COMPANY, OF PITTSBURG, PENNSYLVANIA, A CORPORATION OF PENNSYLVANIA.

VALVE-GEAR FOR ENGINES.

No. 917,452.　　　Specification of Letters Patent.　　　Patented April 6, 1909.

Application filed August 27, 1906. Serial No. 332,085.

*To all whom it may concern:*

Be it known that I, ALBERT T. KELLER, of Pittsburg, Allegheny county, Pennsylvania, have invented a new and useful Valve-Gear for Engines, of which the following is a full, clear, and exact description, reference being had to the accompanying drawings, forming part of this specification, in which—

Figure 1:
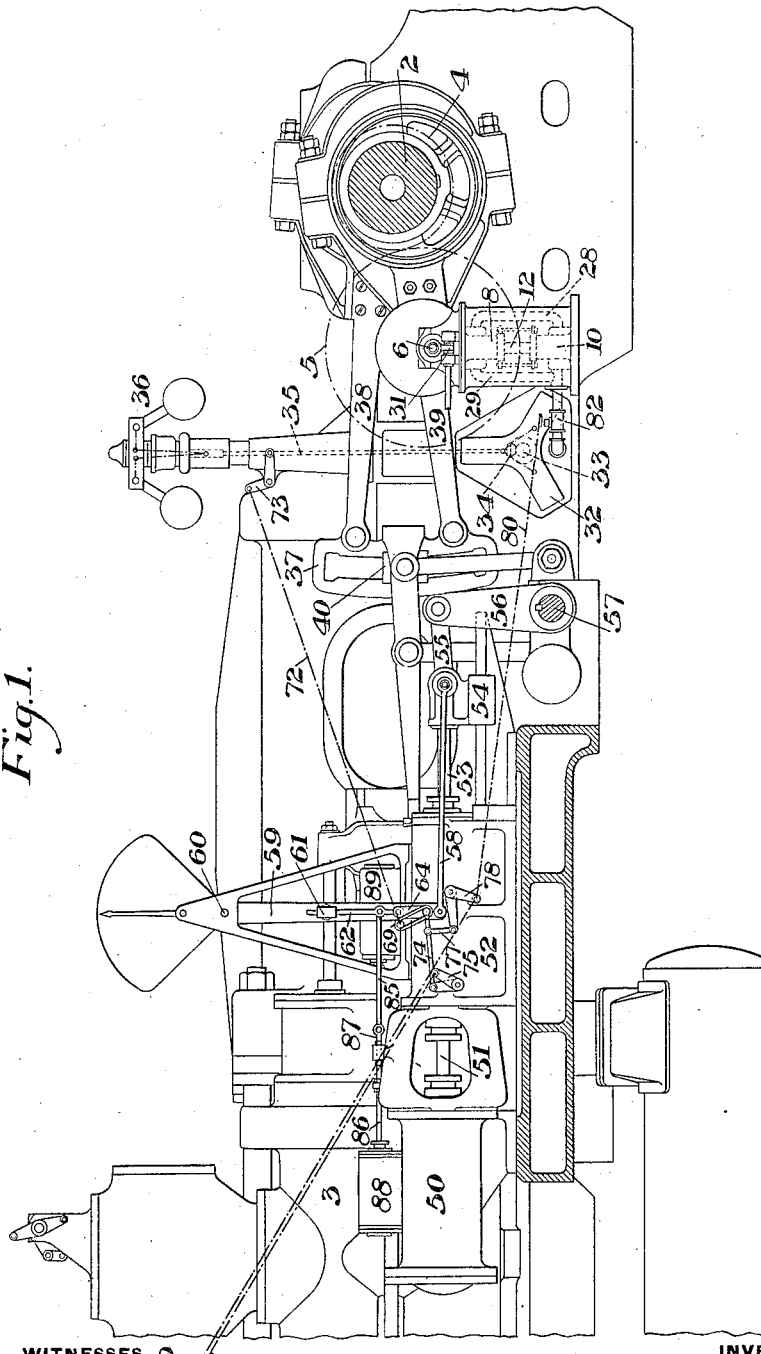
Figure 4:
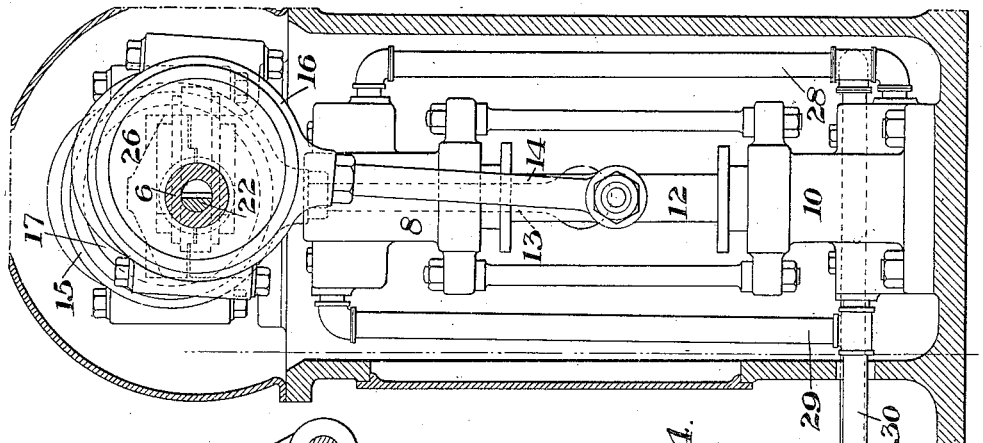
Figure 3:
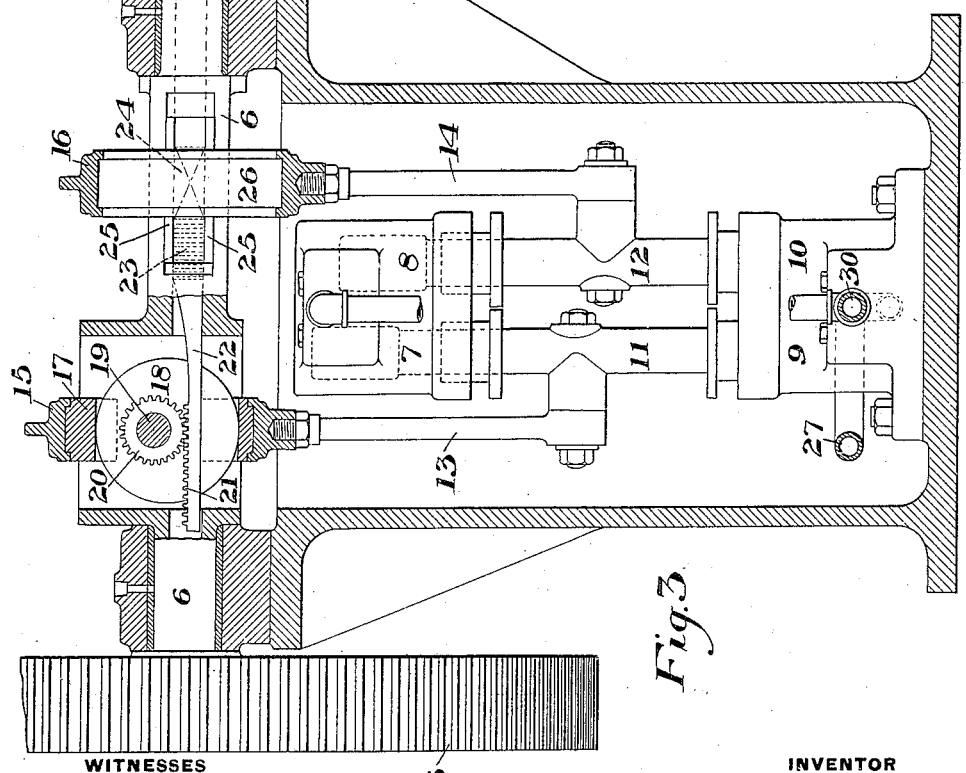

Figure 1 is a sectional side elevation showing part of an engine constructed in accordance with my invention; Fig. 2 is a partial top plan view of the same; Figs. 3 and 4 are enlarged sectional detail views of the pumping mechanism; Fig. 5 is an enlarged end view of part of the lever mechanism shown in Fig. 1; Fig. 6 is a side view of the same; Fig. 7 is a view similar to Fig. 6 but with the parts in another position; and Fig. 8 is an enlarged detail view, partly in horizontal section, showing the slotted link and its connections.

My invention relates to the controlling or governing of engines provided with link mechanism; and the object of the invention is to give an economical engine of this type wherein the operator may manually control the cut-off according to the work done.

The invention provides a variable speed mechanism for driving the governor of such an engine in connection with hand-controlled means for temporarily changing the speed of the governor and thereby changing the speed of the engine.

It also provides means whereby the engine may be controlled either by the governor or by the engineer at will.

Heretofore in this type of engine, the operator has manually controlled the point of cut-off by shifting the link usually connected to a motive cylinder which accomplishes the link shifting. In my invention, this link is connected to and operated by the governor, and the governor is driven through a variable speed device having a hand-controlled changing device. The mechanism is, however, preferably so arranged that the operator may also manually control the point of cut-off in the usual way.

In the drawings, in which I show my invention as applied to a twin-tandem compound engine, 2 represents the main crank shaft, and 3 one of the low pressure cylinders, the engine being broken away along a substantially central longitudinal line as well as intermediate of the low pressure cylinder. A toothed wheel 4 on the main crank shaft is shown as driving a toothed wheel 5 on the main shaft 6 of a hydraulic pumping device. This pump is shown as provided with four cylinders 7, 8, 9 and 10, with the common plungers 11 and 12 for each pair, these plungers being actuated by eccentric-rods 13 and 14 leading to eccentric straps 15 and 16. The eccentric strap 15 surrounds an eccentric 17, which in turn surrounds two eccentric disks 18 placed at right angles to its plane and mounted on a shaft 19. Between these two eccentric disks is placed a pinion 20 engaging rack teeth 21 on a sliding rack 22. The teeth 21 are on the upper face of the rack, which in another portion thereof is provided with side teeth 23 engaging another pinion indicated at 24 on a shaft having two eccentric disks 25 located within the eccentric 26, which is shown in elevation and around which extends the eccentric strap 16.

In the form shown, 27 is the inlet pipe having the branch 28, while 29 and 30 are the outlet pipes for the fluid being pumped. The rack 22 extends centrally within the hollow shaft 6, and its projecting end is connected by lever 31 to any suitable hand-operated link or lever. By manually shifting the rack 22 endwise, the position of the eccentric disks 18 and 25 will be varied, thus correspondingly varying the stroke of the pumps. The liquid flows through pipe 30 from these pumps to the supply ports of a hydraulic motor, indicated at 32, Fig. 1. I have illustrated this hydraulic motor as consisting of three cylinders arranged radially around a crank shaft and having their pistons connected to cranks thereon. The crank shaft 33 of this motor has a beveled gear connection, indicated at 34, with a governor spindle 35. This governor, shown at 36, may be of any desirable type, such as the usual centrifugal weight type, it being driven through the spindle 35.

The engine is provided with a link reverse, and with any suitable means for shifting the link. In the form shown, the link 37 having the eccentric rod connections 38 and 39 is constructed according to the well-known Allen system. In the form shown, 40 is the sliding block, and 50 is the steam cylinder whose piston rod 51 is connected to the piston of a hydraulic cylinder 52, whose piston rod 53 is connected to the link mechanism. The rods 51 and 53 are parts of the same piston rod which is common to the pistons of both cylinders. The liquid in cylinder 52 flows back and forth around the piston, so that the cylinder acts as a check device. The rod 53 is connected to cross-head 54 having a link 55 connecting it to a lever 56 on the tumbling shaft 57. To this cross-head is also pivotally connected the link 58, whose other end is connected to a lever 59 fulcrumed at 60. The lever 59 is provided with a pivoted sleeve 61, through which loosely extends the end portion of a floating lever 62 fulcrumed at 63 on a rock lever 64 mounted on rock shaft 65, on the other end of which is a rock arm or lever 66. The upper end of this rock arm or lever is provided with a bearing pin 67 surrounded by bushing 68, (see Fig. 8) which engages a slotted link 69. At the respective end portions of this link are pins or studs 70 and 71, the pin 70 being connected by a rod 72 with a bell crank lever 73 which is suitably connected to that member of the governor which is raised and lower by its action. The pin 71 is connected by a link 74 and a rocker 75 to an operating rod 76 which extends to the engineer's stand or pulpit. Connected to the link 74 by means of a link 77 and a rocker 78 are rods 79 and 80. The rod 79 runs to the engineer's stand, and the rod 80 is connected to a lever 81 on the stem by a by-pass valve 82 in a pipe 83 which connects the pipes 27 and 30 of the pump before described. Connected to the floating lever 62 is a rod 85 which is connected to a valve rod 86 by means of a sliding or reciprocating connection 87. The valve rod 86 connects together the distributing valves in the chests 88 and 89 of the cylinders 50 and 52, the pistons of which control the setting of the link 37.

The pump described forms a means by which the speed of the engine may be changed, the operator actuating the lever 31 to thereby shift the eccentrics 17 and 26 on the shaft 6. This changes the stroke of the plungers 11 and 12, thereby causing more or less liquid to be pumped into the motor 32 according as the stroke is lengthened or shortened. This changes the speed of said motor, and effects a corresponding change in the speed of the governor spindle 35. This change in speed acts upon the slotted link 69 through the bell crank 73 and the rod 62. With the parts in the position shown in Fig. 6, the pin 71 at the lower end of the link 69 is in direct line with the rock shaft 65, and the lever 66 and link 69 are caused to move in unison, the floating lever 62 being moved thereby through the rocker lever or arm 64. This moves the connecting rod 85 and thereby changes the position of the distributing valve in the cylinders 88 and 89 to thereby move the link 37. The movement of the cross-head 54 actuates the lever 59 through the connection 58 and returns the floating lever 62 to its original position, thereby closing the distributing valves and preventing further movement of the pistons in the cylinders 50 and 52.

The governor controls the engine in this manner in one direction only, which direction is predetermined by the arrangements of the connections, as the engine may be initially built to be governor controlled in either direction.

When the engineer desires to control the engine independently of the governor and in both directions, he actuates the rod 79, thereby moving the slotted link 69 into the position shown in Fig. 7, and at the same time, through the connection 80, opening the by-pass valve 82 between the pipes 27 and 30. This permits a free circulation by the pump independently of the motor 32 and stops the governor. When the link 69 is thrown into the position shown in Fig. 7, the pin 71 at its lower end portion is thrown into line with the pin 67 of the rocker lever 66, so that by actuating the rod 76 the arm 66 may be given any desired movement. This gives a corresponding movement to the floating lever 62, and through the connection 85 controls the position of the valves for the cylinders 50 and 52 to regulate the position of the link 37.

By means of the by-pass valve 32, operated through the connection 80 in the manner described, I enable the engine to be used in the ordinary manner of the common rolling mill reversing engine.

Where reversing engines are used for rolling mill work, it is quite common for the mill to handle alternately short and long pieces, some of these pieces having greater draft than others. By the use of my improved engine, the operator can speed up the engine where he is working upon a long piece and thus roll the piece more rapidly; while with a shorter piece of heavier draft, he can run the engine at a slower speed with sufficient power to give the necessary draft. At the same time the engine may be put under governor control at any time; so that economy of steam is provided owing to automatic shifting of the cut-off according to load.

In rolling mill practice, reversing engines are often driven in one direction for considerable lengths of time. At other times they are reversed at rapid intervals. It will be obvious that with my improved engine, economy of action is given in both such cases, whereas with the ordinary reversing engine running in one direction, its operation is wasteful on the account of the manual shifting of the cut-off and the lack of governor control.

The engine may be provided with one or a number of cylinders, and may be either single or compound, and many changes may be made in the form and arrangement of the variable speed device and the connections between the governor and the link motion without departing from my invention; since I consider myself the first to provide a reversing engine with a governor and to employ a hand-controlled device for changing the speed of the engine.

I claim:—

1. In a reversing engine, the combination of a cut-off mechanism, means for shifting said mechanism to control the operation of the engine, a governor for controlling said shifting means, a manually operated means for controlling said shifting means, and means for placing said shifting means under the exclusive control of either said governor or said manually operated means; substantially as described.

2. In a reversing engine, the combination of a cut-off mechanism, a link motion connected to the cut-off mechanism, a governor for shifting the link motion, a manual controller for shifting the link motion, and means for placing said link motion under the exclusive control of either said governor or said manual controller, said governor acting to control the engine only during its operation in one direction; substantially as described.

3. In a reversing engine, the combination of a cut-off mechanism, a link motion connected to the cut-off mechanism, a governor for shifting the link motion, a manual controller for shifting the link motion, and means for rendering either of them effective to shift the link motion to the exclusion of the other, said governor acting to control the engine only during its operation in one direction; substantially as described.

4. In a reversing engine, the combination of a cut-off mechanism, a link motion connected to the cut-off mechanism, a governor for shifting the link motion, a manual controller for the link motion and manually controlled means connected to the governor and to the manual controller for rendering either of them effective to shift the link motion to the exclusion of the other, said governor acting to control the engine only during its operation in one direction; substantially as described.

5. In a reversing engine, the combination of a cut-off mechanism, a link motion connected to the cut-off mechanism, a governor for shifting the link motion, a manual controller for controlling the link motion, and manually controlled means connected to the governor and to the manual controller for rendering either of them effective to shift the link motion to the exclusion of the other, said governor acting to control the engine only during its operation in one direction, and said manual controller acting to control the engine in either direction; substantially as described.

6. In a reversing engine, the combination of a cut-off mechanism, a link motion connected to the cut-off mechanism, a motor and connection for shifting the link motion, a governor for controlling the motor, a manual controller for the motor, and means for rendering either of them effective to control the motor to the exclusion of the other; substantially as described.

7. In a reversing engine, the combination of a cut-off mechanism, a link motion connected to the cut-off mechanism, a motor and connections for shifting the link motion, a governor to control the motor, a manual controller for the motor, and manually operated controlling means for rendering either of them effective to control the motor to the exclusion of the other, said governor acting to control the engine only during its operation in one direction; substantially as described.

8. In a reversing engine, the combination of a cut-off mechanism, a link motion connected to the cut-off mechanism, a governor having a variable speed device for shifting the link motion, a manual controller for shifting the link motion, and manually controlled means connected to the governor and to the manual controller for rendering either of them effective to shift the link motion to the exclusion of the other, said governor acting to control the engine during its operation in one direction; substantially as described.

9. In a reversing engine, the combination of a cut-off mechanism, a link motion connected to the cut-off mechanism, a shifting device for the link motion, a governor for controlling the shifting device, a manual controller for the shifting device, and manually controlled means connected to the governor and to the manual operated controller for rendering either of them effective for controlling the shifting device to the exclusion of the other; substantially as described.

10. In a reversing engine, the combination of a cut-off mechanism, means for shifting said mechanism to control the operation of the engine, a governor for controlling said shifting means, a manually operated means for controlling said shifting means, and a floating lever connected to the governor and said manually operated means, and means to shift said floating lever to place said shifting means under the exclusive control of either said governor or said manually operated means; substantially as described.

11. In a reversing engine, the combination of a cut-off mechanism, a link motion connected to the cut-off mechanism, a movable member connected to the link motion, a governor connected to the movable member, a manually operated means connected to the movable member, and means to shift said movable member for placing said link motion under the exclusive control of either said governor or said manually operated means; substantially as described.

12. In a reversing engine, the combination of a cut-off mechanism, a link motion connected to the cut-off mechanism, a motive cylinder shifting device for the link motion, a controlling valve for the cylinder shifting device, a floating lever connected to the controlling valve, a governor connected to the floating lever, a manually operated means connected to the floating lever, and means for shifting the floating lever for placing said cylinder shifting device under the exclusive control of either said governor or said manually operated means; substantially as described.

13. In a reversing engine, a governor, a motor for the governor, a pump driven by the engine for actuating the motor, and means for varying the action of the pump; substantially as described.

14. In a reversing engine, a governor, a motor for driving the governor, a pump operated by the engine for supplying the motor, and means for changing the stroke of the pump; substantially as described.

15. In a reversing engine, a governor, a motor for driving the governor, a pump for supplying fluid to the motor, means for varying the action of the pump, and means for rendering the motor inoperative; substantially as described.

16. In a reversing engine, the combination of a cut-off mechanism, a link motion connected to the cut-off mechanism, a motive cylinder shifting device connected to the link motion, a governor connected to the motive cylinder shifting device, a manually operated controlling means connected to the motive cylinder shifting device, means for placing the motive cylinder shifting device under the exclusive control of either said governor or said manually operated means, a motor for driving the governor, and connections between the motor driving mechanism and the governor shifting means for rendering said motor inoperative when the governor is disconnected; substantially as described.

In testimony whereof, I have hereunto set my hand.

ALBERT T. KELLER.

Witnesses:
   Geo. B. Bleming,
   John Miller.